US012561536B2

(12) United States Patent

Brahma et al.

(10) Patent No.: US 12,561,536 B2

(45) Date of Patent: Feb. 24, 2026

(54) AUTO-TRANSLATION SYSTEM FOR VOICEMAIL TRANSCRIPTIONS

(71) Applicant: T-Mobile USA, Inc., Bellevue, WA (US)

(72) Inventors: Dhurjati Brahma, Bellevue, WA (US); Chingming Chao, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 191 days.

(21) Appl. No.: 18/492,598

(22) Filed: Oct. 23, 2023

(65) Prior Publication Data

US 2025/0131213 A1 Apr. 24, 2025

(51) Int. Cl.

| | |
|---|---|
| *G06F 40/58* | (2020.01) |
| *G10L 15/00* | (2013.01) |
| *G10L 15/26* | (2006.01) |
| *G10L 15/30* | (2013.01) |
| *H04M 3/533* | (2006.01) |

(52) U.S. Cl.
CPC ............ *G06F 40/58* (2020.01); *G10L 15/005* (2013.01); *G10L 15/26* (2013.01); *G10L 15/30* (2013.01); *H04M 3/533* (2013.01)

(58) Field of Classification Search
CPC ....... G06F 40/58; G10L 15/005; G10L 15/26; G10L 15/30; H04M 3/533; H04M 3/53333
USPC .............................................................. 704/2
See application file for complete search history.

(56) References Cited

U.S. PATENT DOCUMENTS

| | | | | |
|---|---|---|---|---|
| 4,319,337 | A * | 3/1982 | Sander ................... | H04M 11/10 |
| | | | | 704/201 |
| 4,621,350 | A * | 11/1986 | Sevitsky ................ | G11B 31/00 |
| | | | | 369/29.01 |
| 4,623,988 | A * | 11/1986 | Paulson ................ | G06F 11/328 |
| 6,865,258 | B1 * | 3/2005 | Polcyn ................... | G10L 15/26 |
| | | | | 379/265.09 |

(Continued)

FOREIGN PATENT DOCUMENTS

| | | |
|---|---|---|
| CN | 101711381 A | 5/2010 |
| DE | 112007002090 T5 | 7/2009 |

(Continued)

OTHER PUBLICATIONS

International Search Report and Written Opinion for PCT/US2024/052429 dated Jan. 24, 2025, 10 pages.

*Primary Examiner* — Thuykhanh Le

(74) *Attorney, Agent, or Firm* — Perkins Coie LLP

(57) ABSTRACT

The disclosed technology includes a voicemail translation service of a telecommunications network. The voicemail translation service can receive a voicemail message communicated from a calling party to a called party. The voicemail translation service calls an application programming interface (API) to upload the voicemail message to a transcription service, which completes transcription of the voicemail message in a default language. In response to determining that the default language of the completed transcription does not match a target language of the called party, the voicemail translation service triggers another API to generate a translation of the transcription in accordance with the target language. The voicemail translation service then stores the translated transcription in a voicemail storage system that is accessible by the called party.

18 Claims, 4 Drawing Sheets

(56) References Cited

U.S. PATENT DOCUMENTS

| | | | | |
|---|---|---|---|---|
| 6,891,934 | B1* | 5/2005 | Gao | H04M 1/2535 |
| | | | | 370/352 |
| 7,206,303 | B2* | 4/2007 | Karas | H04N 21/435 |
| | | | | 725/135 |
| 7,212,619 | B1* | 5/2007 | Gerritse-Van Bavel | |
| | | | | H04M 3/527 |
| | | | | 379/201.02 |
| 7,346,505 | B1* | 3/2008 | Sherwood | H04M 3/53333 |
| | | | | 704/235 |
| 7,403,898 | B2 | 7/2008 | Slemmer et al. | |
| 8,064,576 | B2 | 11/2011 | Skakkebaek et al. | |
| 8,107,598 | B2 | 1/2012 | Skakkebaek et al. | |
| 8,184,780 | B2* | 5/2012 | Siminoff | H04M 3/53333 |
| | | | | 379/88.22 |
| 8,204,486 | B2 | 6/2012 | Brock et al. | |
| 8,244,221 | B2 | 8/2012 | Gravino et al. | |
| 8,284,909 | B2 | 10/2012 | Seetharaman et al. | |
| 8,300,776 | B2 | 10/2012 | Davies et al. | |
| 8,306,509 | B2 | 11/2012 | Sigmund et al. | |
| 8,345,832 | B2 | 1/2013 | Hamaker et al. | |
| 8,352,264 | B2 | 1/2013 | White et al. | |
| 8,406,386 | B2 | 3/2013 | Yin et al. | |
| 8,416,927 | B2 | 4/2013 | Siminoff | |
| 8,417,223 | B1 | 4/2013 | Trivi | |
| 8,442,496 | B2 | 5/2013 | Sigmund et al. | |
| 8,442,827 | B2* | 5/2013 | Duffield | G10L 15/18 |
| | | | | 704/254 |
| 8,447,604 | B1* | 5/2013 | Chang | H04N 21/435 |
| | | | | 704/235 |
| 8,498,625 | B2 | 7/2013 | Trivi | |
| 8,583,373 | B2* | 11/2013 | Hicks | B61L 25/025 |
| | | | | 701/533 |
| 8,681,964 | B1* | 3/2014 | Cordell | H04M 3/42 |
| | | | | 379/93.21 |
| 8,694,305 | B1* | 4/2014 | Grove | G06F 40/40 |
| | | | | 704/4 |
| 8,706,474 | B2* | 4/2014 | Blume | G06F 40/40 |
| | | | | 704/7 |
| 8,768,704 | B1* | 7/2014 | Fructuoso | G06F 40/284 |
| | | | | 704/277 |
| 9,723,125 | B2 | 8/2017 | Seetharaman et al. | |
| 9,936,061 | B2 | 4/2018 | Seetharaman et al. | |
| 10,067,734 | B2* | 9/2018 | Watson | H04R 1/1041 |
| 10,388,272 | B1* | 8/2019 | Thomson | G10L 15/22 |
| 10,573,312 | B1* | 2/2020 | Thomson | G10L 15/22 |
| 10,594,851 | B2 | 3/2020 | Seetharaman et al. | |
| 11,663,422 | B2* | 5/2023 | Pandey | G06F 40/30 |
| | | | | 704/2 |
| 11,749,281 | B2* | 9/2023 | Krishnaswamy | G10L 15/1822 |
| | | | | 704/2 |
| 2006/0271365 | A1* | 11/2006 | Maes | H04M 3/533 |
| | | | | 704/E15.04 |
| 2007/0037610 | A1* | 2/2007 | Logan | H04M 1/72448 |
| | | | | 455/574 |
| 2007/0117544 | A1 | 5/2007 | Doulton | |
| 2008/0039963 | A1* | 2/2008 | Shih | G06F 9/445 |
| 2008/0240380 | A1* | 10/2008 | Siminoff | H04M 3/53333 |
| | | | | 379/88.13 |
| 2008/0273675 | A1 | 11/2008 | Siminoff | |
| 2009/0037536 | A1* | 2/2009 | Braam | H04L 67/59 |
| | | | | 370/352 |
| 2009/0052636 | A1* | 2/2009 | Webb | H04M 3/53333 |
| | | | | 704/235 |
| 2009/0192782 | A1* | 7/2009 | Drewes | G06F 40/44 |
| | | | | 379/202.01 |
| 2010/0241429 | A1* | 9/2010 | Siminoff | G10L 15/26 |
| | | | | 704/235 |
| 2010/0293230 | A1* | 11/2010 | Lai | G06F 40/58 |
| | | | | 709/227 |
| 2011/0105087 | A1* | 5/2011 | Toebes | H04M 3/53383 |
| | | | | 455/466 |
| 2011/0125580 | A1* | 5/2011 | Erhart | H04M 3/5233 |
| | | | | 705/14.54 |
| 2011/0238407 | A1* | 9/2011 | Kent | G10L 15/26 |
| | | | | 704/3 |
| 2011/0305327 | A1* | 12/2011 | Shaw | H04M 3/53333 |
| | | | | 379/88.14 |
| 2012/0020577 | A1* | 1/2012 | Yasrebi | G10L 21/12 |
| | | | | 382/229 |
| 2012/0116751 | A1* | 5/2012 | Bernardini | G06F 40/51 |
| | | | | 704/3 |
| 2012/0185236 | A1* | 7/2012 | Blodgett | G06F 40/58 |
| | | | | 704/2 |
| 2012/0316861 | A1* | 12/2012 | Custer | G06F 40/58 |
| | | | | 704/2 |
| 2013/0010937 | A1* | 1/2013 | Sigmund | H04M 3/53325 |
| | | | | 379/88.12 |
| 2013/0077769 | A1 | 3/2013 | Hamaker et al. | |
| 2013/0246041 | A1* | 9/2013 | Costa | G06F 40/58 |
| | | | | 704/2 |
| 2013/0282360 | A1* | 10/2013 | Shimota | G06Q 30/0241 |
| | | | | 704/7 |
| 2014/0113581 | A1* | 4/2014 | Nassimi | H04W 4/90 |
| | | | | 455/404.1 |
| 2014/0129452 | A1* | 5/2014 | Fordyce, III | G06Q 30/014 |
| | | | | 705/303 |
| 2014/0177451 | A1* | 6/2014 | Madj | H04L 65/1096 |
| | | | | 370/241 |
| 2014/0180667 | A1* | 6/2014 | Johansson | G06F 40/58 |
| | | | | 704/235 |
| 2014/0304363 | A1* | 10/2014 | Mhatre | H04L 67/55 |
| | | | | 709/217 |
| 2014/0365203 | A1* | 12/2014 | Waibel | G06F 40/58 |
| | | | | 704/2 |
| 2015/0120278 | A1* | 4/2015 | Waibel | G06F 40/166 |
| | | | | 704/2 |
| 2015/0142901 | A1* | 5/2015 | Hon | H04L 51/226 |
| | | | | 709/206 |
| 2015/0154185 | A1* | 6/2015 | Waibel | G10L 15/005 |
| | | | | 704/2 |
| 2015/0243279 | A1* | 8/2015 | Morse | G10L 15/183 |
| | | | | 704/9 |
| 2015/0286633 | A1* | 10/2015 | Dubal | H04L 67/10 |
| | | | | 709/217 |
| 2015/0287407 | A1* | 10/2015 | Pradeep | G07F 19/20 |
| | | | | 704/235 |
| 2015/0317975 | A1* | 11/2015 | Ruiz Rodriguez | H04M 3/533 |
| | | | | 704/235 |
| 2016/0019816 | A1* | 1/2016 | Parry | G09B 5/06 |
| | | | | 704/2 |
| 2016/0110137 | A1* | 4/2016 | Takasu | G06F 3/121 |
| | | | | 358/1.14 |
| 2016/0352674 | A1* | 12/2016 | Strom | G06F 40/58 |
| 2018/0146349 | A1* | 5/2018 | Chang | H04W 52/0209 |
| 2018/0217983 | A1* | 8/2018 | Seto | G06F 40/58 |
| 2018/0248829 | A1* | 8/2018 | Hardee | H04L 51/214 |
| 2018/0315428 | A1* | 11/2018 | Johnson | G10L 15/26 |
| 2018/0366110 | A1 | 12/2018 | Hashem et al. | |
| 2020/0175961 | A1* | 6/2020 | Thomson | G10L 15/063 |
| 2020/0243094 | A1* | 7/2020 | Thomson | G10L 15/28 |
| 2021/0174807 | A1* | 6/2021 | Mohapatra | H04M 3/53333 |
| 2021/0406791 | A1* | 12/2021 | Chen | H04L 51/214 |
| 2023/0096543 | A1* | 3/2023 | Moy | G06F 40/58 |
| | | | | 704/3 |
| 2023/0197070 | A1 | 6/2023 | Byrne et al. | |
| 2023/0245651 | A1* | 8/2023 | Wang | G06N 5/022 |
| | | | | 704/275 |
| 2023/0259719 | A1* | 8/2023 | Barry | G06F 40/58 |
| | | | | 704/2 |
| 2023/0259990 | A1* | 8/2023 | Limaye | G06N 20/00 |
| | | | | 705/346 |
| 2023/0274089 | A1* | 8/2023 | Tunstall-Pedoe | G06F 40/40 |
| | | | | 704/2 |

(56)        References Cited

U.S. PATENT DOCUMENTS

| | | | | |
|---|---|---|---|---|
| 2024/0256798 | A1* | 8/2024 | Cai | H04L 51/04 |
| 2024/0274122 | A1* | 8/2024 | Wang | G10L 15/16 |

FOREIGN PATENT DOCUMENTS

| | | | |
|---|---|---|---|
| EP | 2126683 | B1 | 12/2016 |
| JP | 5362034 | B2 | 9/2013 |
| JP | 5368320 | B2 | 9/2013 |
| KR | 101383945 | B1 | 4/2014 |
| KR | 20230105258 | A | 7/2023 |
| WO | 2008103504 | A1 | 8/2008 |
| WO | 2008103506 | A1 | 8/2008 |
| WO | 2008103507 | A1 | 8/2008 |
| WO | 2012027480 | A2 | 3/2012 |

* cited by examiner

AUTO-TRANSLATION SYSTEM FOR VOICEMAIL TRANSCRIPTIONS

BACKGROUND

Machine translation is use of either rule-based or probabilistic (e.g., statistical and, most recently, neural network-based) machine learning approaches to translation of text or speech from one language to another, including the contextual, idiomatic and pragmatic nuances of both languages.

Unedited machine translation is publicly available through tools on the Internet such as Google Translate, Babylon, DeepL Translator, and StarDict. These tools produce rough translations that, under favorable circumstances, "give the gist" of the source text. With the Internet, translation software can help non-native-speaking individuals understand webpages published in other languages. Whole-page-translation tools are of limited utility, however, since they offer only a limited potential understanding of the original author's intent and context; translated pages tend to be more erroneously humorous and confusing than enlightening.

BRIEF DESCRIPTION OF THE DRAWINGS

Detailed descriptions of implementations of the present invention will be described and explained through the use of the accompanying drawings.

Figure 1:
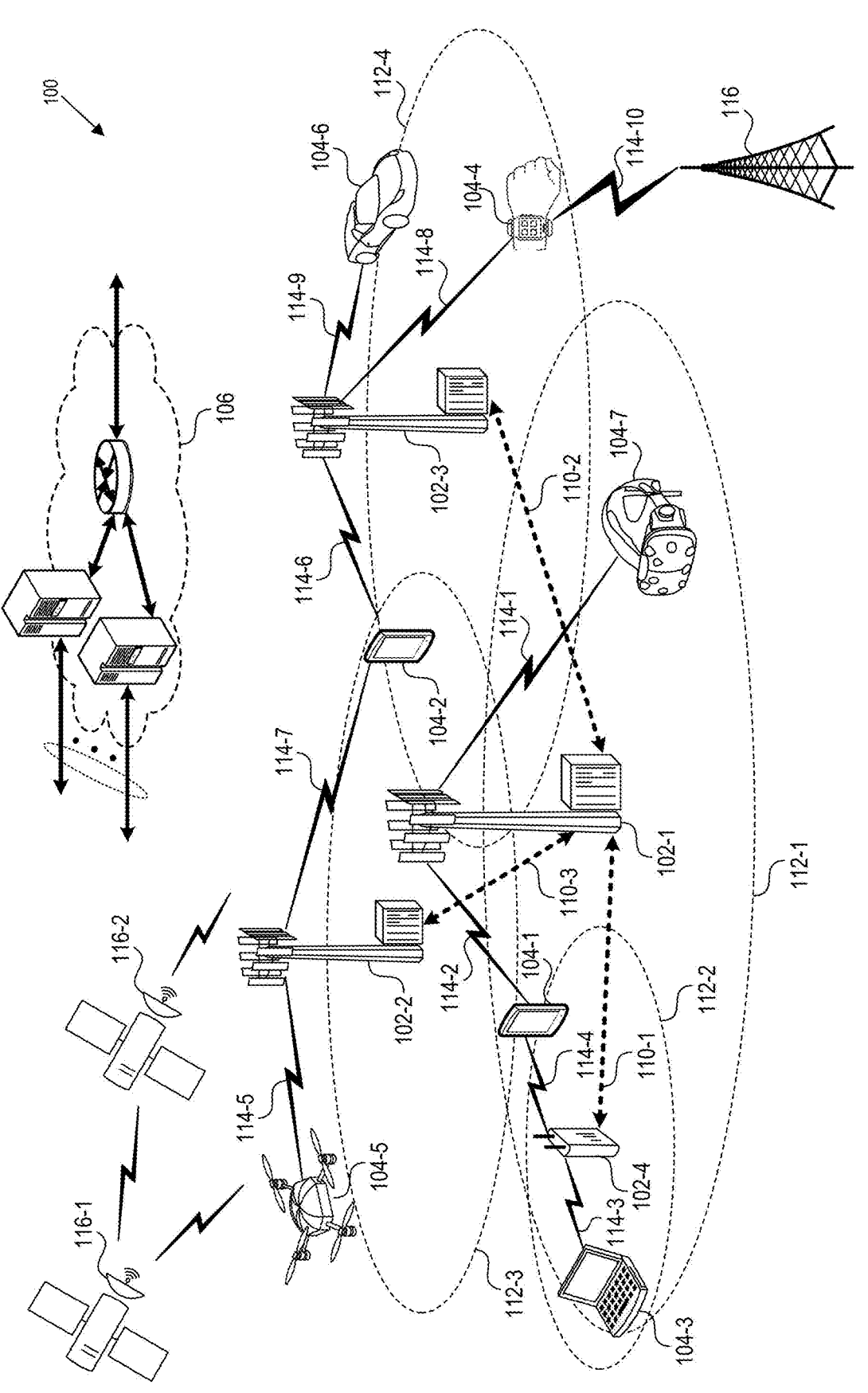
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes a system that provides users with the ability to receive voicemail transcriptions in a user-specific language. The system can operate with telecommunications services including communications between at least a pair of user devices (e.g., smartphones). The system includes a server that manages the process of delivering translated voicemail transcriptions to a user device. For example, the server can receive the voicemail from a first smartphone and create a transcription of the voicemail by calling an Application Programming Interface (API) to do so. The server can generate a translation of the transcription and provide the translated transcription to a second smartphone.

The system can provide users with automatic translated transcriptions by utilizing natural language processing (NLP) and machine learning to transcribe voicemails. In one example, the system utilizes automatic speech recognition (ASR) technology to transcribe the spoken words from the voicemail into written text. A model of the system is able to determine the language spoken in the voicemail by recognizing language-specific acoustic features after being trained on large amounts of speech data from a wide array of different languages. After transcribing the voicemail, NLP techniques are applied to preprocess the text by correctly identifying words in cases of homophones and correctly identifying which punctuation to use in the transcription of the voicemail. After finalizing the transcription, the server can compare the detected language with a user-selected language. In response to determining the detected language does not match the user-selected language, the system can call the API to translate the transcription using translation models. In one example, the system utilizes neural networks trained for language translation such as a neural machine translation algorithm to translate the transcription. The system can account for language-specific rules such as grammar rules and common expressions; therefore, increasing the accuracy of the generated translations.

By calling an API to translate a transcription of a received voicemail, the system simplifies the process of translating the transcription. In addition to that, the API allows the system to reduce development time by interacting with pre-existing software and allowing the system to easily adapt to utilizing those software programs. Overall, the API enables seamless communication and integration between multiple programs.

The disclosed technology solves problems associated with bilingual or multilingual users receiving phone calls and voicemails in languages other than their native languages. Currently, there are no systems to deliver voicemail transcriptions in a user's preferred language. This can be an issue for busy users who can speak another language fluently but have limited capability of reading in that same language. This can lead to communication problems, which can cause the user to not understand important messages. Additionally, by transcribing and translating voicemails, users who are busy in a conference call, meeting or are in a public place where they cannot play received voicemail, can easily read the voicemail transcript received in their chosen translated language and are able to protect their privacy. For example, a user can receive a voicemail about medical test results. By receiving a transcribed message of the voicemail from a doctor's office, the user is able to tell whether they need to return the call immediately or not. This technology thus improves the user's ability to communicate with others quickly and efficiently.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC)).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Auto Translation System

Figure 2:
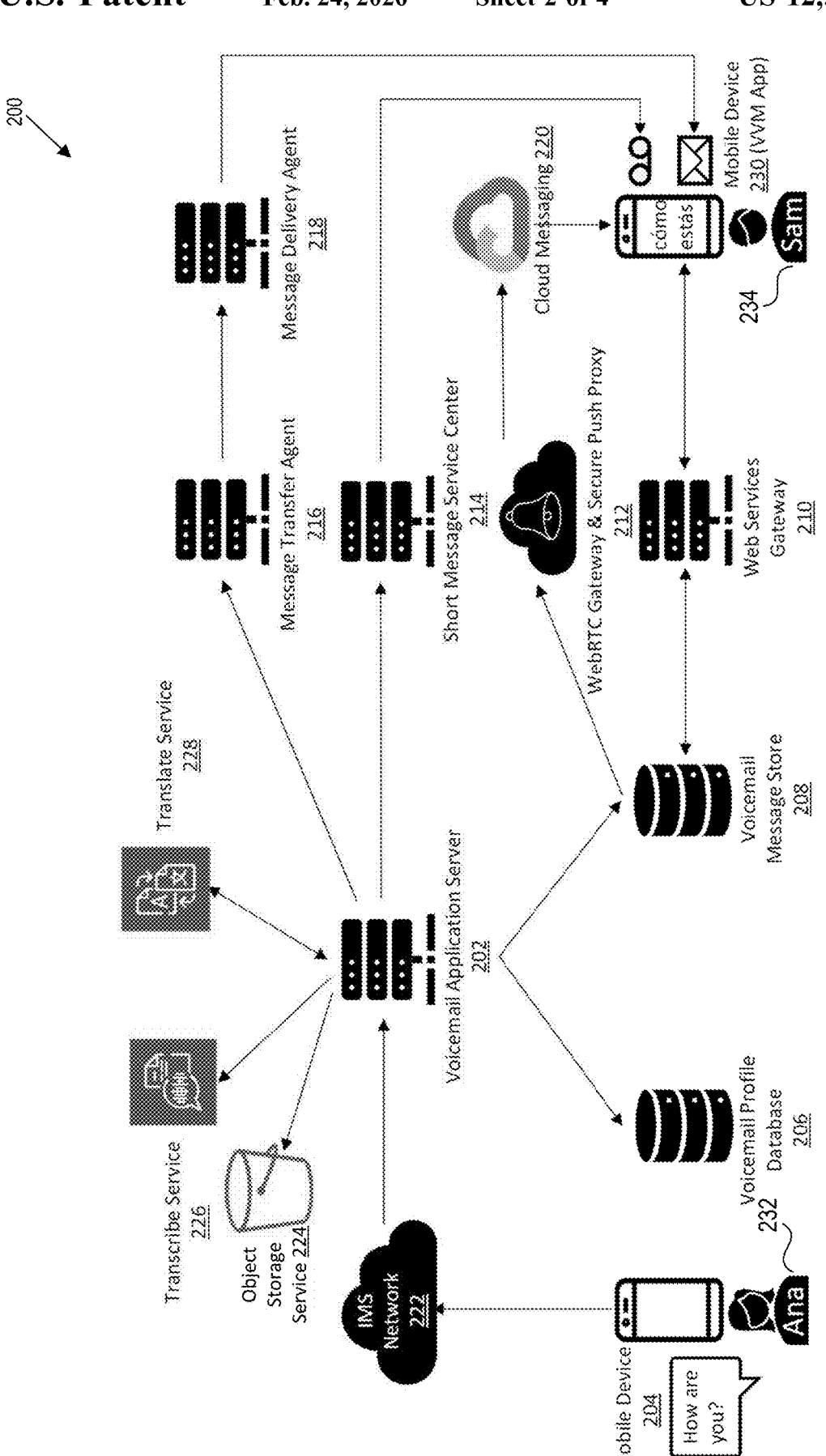
FIG. 2 is a block diagram that illustrates a system for translating a voice message into a target language.

FIG. 2 illustrates an auto translation system 200 including a voicemail application server 202 configured to receive and manage requests to transcribe and update voicemails. The voicemail application server 202 includes processing components, software, and other components configured to connect and exchange data with other devices and systems over the internet or other communications networks. As such, the voicemail application server 202 can connect to mobile device 204, voicemail profile database 206, voicemail message store 208, short message service center 214, message transfer agent 216, IP Multimedia Subsystem (IMS) network 222, object storage service, transcribe service 226, translate service 228, and mobile device 230. As such, the user can receive voicemail transcriptions in their preferred language.

A voicemail is a digital recorded message left by a first user (e.g., calling party) for a second user (e.g., called party) when the second user is unable to answer a phone call. It serves as a way to leave a verbal message when the recipient is unavailable or chooses not to answer the call. Voicemail messages are typically stored on the recipient's voicemail-box on a voicemail system, which is hosted by a telecommunications service provider. The voicemail application server 202 can receive, via the telecommunications network, a voicemail message communicated from a first user device such as mobile device 204 associated with the first user (e.g., user 232) to a second user device such as mobile device 230 associated with the second user (e.g., user 234). For example, mobile device 204 can initiate a phone call to mobile device 230. The phone call is routed through an IMS network such as IMS network 222 associated with the telecommunication network. IMS network refers to the architectural framework in the telecommunications to deliver the phone call. For instance, when the user 232 initiates a call to user 234, the IMS network 222 can manage the exchange of information between the mobile device 204 and mobile device 230 based on Session Initiation Protocol (SIP) and Real-time Transport Protocol (RTP). This allows the telecommunication network to initiate and maintain real-time multimedia communication sessions over IP networks such as Wi-Fi and cellular networks. The IMS network 222 enables the delivery of voicemails to the voicemail application server 202 over IP-based networks. The IMS network 222 can also prioritize voice traffic. This allows the voicemail application server 202 to receive voicemails with high-quality audio.

The IMS network 222 can determine when a call from user 232 is not accepted by user 234. For example, during the call, the IMS network 222 sends an alerting signal to mobile device 230. Mobile device 230 can transmit a response in response to the alerting signal. In one embodiment, mobile device 230 can transmit a rejection signal to the IMS network 222. In another embodiment, mobile device 230 may transmit no signal. If the IMS network 222 receives no response within a certain time frame, the IMS network 222 determines the call isn't being accepted. In response to determining the call isn't being accepted, the IMS network 222 routes the call to the voicemail application server 202. The voicemail application server 202 can record the voicemail message from user 232. The voicemail application server 202 can store the voicemail message as an audio file by calling a storage API to the object storage service 224 if user 234 is subscribed to the voicemail transcription service.

After recording the voicemail message and uploading it to the object storage service 224, the voicemail application server 202 can call a transcribe API that would access the voicemail message from the object storage service 224 and process for transcription using transcribe service 226. An API is a set of protocols that allow different software applications to communicate with each other. By doing so, APIs facilitate interoperability between different systems.

For example, the voicemail application server 202 can record a voicemail message in English, "How are you" from user 232. The voicemail application server 202 can upload the audio file into the object storage service 224 using PutObject REST API. For instance, the API can authenticate the credentials needed to access the object storage service 224 to upload the voicemail audio file. The transcribe service 226 is a cloud-based Automatic Speech Recognition service. The transcribe service 226 can process an audio file and convert it into written text. Using ASR technology, the transcribe service 226 can identify spoken words, accurate punctuations, and other linguistic elements from the voicemail message. In response to the voicemail message being uploaded to the storage 224, the voicemail application server 202 can call an API that would use a MediaFileUri (Uniform Resource Identifier) to access the audio file location on the object storage service 224 to initiate a transcription of the voicemail message by the transcribe service 226. For example, after determining there was a successful upload, the voicemail application server 202 can create a transcribe job by calling StartTranscriptionJob REST API. For instance, the API can authenticate the credentials needed to access the transcribe service 226 to start the transcription job.

In some embodiments, transmitting the command to initiate the transcription of the voicemail message by the transcribe service 226, the voicemail application server 202 can receive a confirmation signal from the transcribe service 226 via an API. The confirmation signal indicates a successful receipt and processing of the entirety of the voicemail message. For example, the voicemail application server 202 can receive an API response that includes details about the transcribe job such as the job name and its status and associated timestamps. For instance, the API response may include a status as in-progress and the timestamp that the transcribe server 226 started the job. By doing so, the voicemail application server 202 can ensure that the transcribe service 226 is functioning properly. Additionally, the voicemail application server 202 checks that the whole voicemail is being transcribed.

In some embodiments, the voicemail application server 202 can invoke another API to inspect the progress of the transcription of the voicemail message by the transcribe service 226. The voicemail application server 202 can receive, via the API, an indication of an incomplete status for the transcription of the voicemail message by the transcribe service 226. In response to receiving the indication of the incomplete status, calling the API to inspect the progress of the transcription of the voicemail message after a time interval until the transcription of the voicemail message is completed. For example, to know the status of the transcribe job, the voicemail application server 202 calls GetTranscriptionJob REST API. If status of transcribe job is in-progress then the voicemail application server 202 calls this API again after configured time interval till the time it gets the status as completed. By doing so, the voicemail application server 202 can continuously check on the transcription of the voicemail message using APIs.

The voicemail application server 202 can receive, from the transcribe service 226, a completed transcription of the voicemail message in a default language value. For example, the default language value refers to the detected language from the audio file. For instance, if the user 232 was speaking in English, then the transcribe service 226 transcribes the voicemail in English. For example, the voicemail application server 202 can retrieve the voicemail transcript from the object storage service 224 using GetObject REST API. GetObject REST API can use the TranscriptFileUri (Uniform Resource Identifier) specified in the GetTranscriptionJob API "completed" status response to access the transcript file location on the object storage service 224. This API allows for efficient data retrieval for large files to and from various applications.

The voicemail application server 202 can retrieve from the voicemail profile database 206, an indication of a target language value for the completed transcription. The voicemail profile database 206 can store multiple user profiles for subscribers of the voicemail translation service. The target language value corresponds to a user-chosen language value in a user profile of the user 234. For example, the voicemail application server 202 can query voicemail profile database 206 to determine the recipient (e.g., user 234) is a user with voicemail translation service with Spanish as a chosen translation language.

The voicemail application server 202 can compare the default language value of the completed transcription to the target language value. For example, the voicemail application server 202 can compare the language value of transcript English with user 234 chosen translation language, Spanish. In response to determining that the default language value of the completed transcription (e.g., English) does not match the target language value (e.g., Spanish), the voicemail application server 202 can trigger an API to generate a translation of the completed transcription in accordance with the target language value. For example, the voicemail application server 202 can trigger an API request to process an English transcript to receive a Spanish text in return. The API can transmit the completed transcription to a translate service 228. The translate service 228 is a cloud-based machine translation service. The translate service 228 can use machine learning to generate the translated transcription of the voicemail. A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning model can be a neural network with multiple input nodes that receive data inputs such as high amounts of multilingual text data. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used to generate translations. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

The translate service 228 can utilize a neural machine translation (NMT) model to generate the translated transcription of the voicemail. For instance, the NMT uses artificial neural networks to translate one language to another. The translate service 228 can include an encoder-decoder architecture. For example, an encoder transforms the transcription into a vector. The decoder takes the vector as an input and outputs a translated transcription of the voicemail. The decoder generates one word at a time and takes into consideration the context of the sentence and the previous words that were generated.

The voicemail application server 202 can store the translation of the completed transcription in a voicemail message store 208. The voicemail message store 208 is accessible by the user 234. The language value of the translation of the completed transcription matches the target language value. For example, the voicemail application server 202 can receive from the translate service 228 the translated voicemail message transcription of "How are you" from user 232 into Spanish as "cómo estás". After that the voicemail application server 202 can store the translated transcription in voicemail message store 208.

After storing the translated transcription, the voicemail application server 202 can generate a notification indicating a new message for the user 234. After that, the voicemail application server 202 can determine how to present the voicemail message to user 234. For instance, the voicemail application server 202 can retrieve, from the voicemail profile database 206, an indication of a user preference for a delivery method for notifications of translated voicemail messages.

In one embodiment, the voicemail application server 202 can determine that the user preference includes a short message service (SMS). In response to that, the voicemail application server 202 can transmit, to the second user device (e.g., mobile device 230), an SMS message including a notification about the translation of the completed transcription is stored at the voicemail message store 208. For example, an SMS Voicemail Message Waiting Indicator (MWI) Notification is sent by the voicemail application server 202 to the Short Message Service Center (SMSC) 214. The short message service center 214 is an important component of the SMS infrastructure in telecommunications networks. It is responsible for managing SMS messages between mobile devices. SMSC 214 delivers the SMS Voicemail MWI along with the SMS containing voicemail transcription to mobile device 230.

In another embodiment, the voicemail application server 202 can determine the user preference includes an electronic mailbox. In response to determining that, the voicemail application server 202 can transmit a push notification to a secure push proxy server 212. The secure push proxy server 212 manages push services in telecommunication networks. The secure push proxy server 212 delivers the push notification to the electronic mailbox of the second user. The push notification indicates that the translation of the completed transcription is stored at the voicemail message store 208. For example, in response to determining that user 234 is registered for push notifications, the voicemail message store 208 sends a push notification to Secure Push Proxy server 216. Secure Push Proxy 216 delivers the push notification to the mobile device 230 via Cloud Messaging 220.

In some embodiments, the voicemail application server 202 can determine the user preference indicates electronic mail. In response to determining that, the voicemail application server 202 can transmit a notification about the translation of the completed transcription stored at the voicemail message store 208 to a message transfer agent 216. The message transfer agent 216 delivers the notification to the second user device (e.g., mobile device 230) via the message delivery agent 218. The message transfer agent 216 and message delivery agent 218 are two key components in email communication systems. The message transfer agent 216 manages routing email messages between servers. The message delivery agent 218 places the email message to the mailbox from MTA 216. For example, user 234 can set his/her email address in the voicemail profile as their preferred method of receiving messages. The voicemail application server 202 can send an email notification to Message Transfer Agent 216. The MTA 216 delivers the email containing the translated transcription text and attached voicemail via Message Delivery agent 218 to the email inbox on mobile device 230.

Depending on the user preference, upon receiving the notification, mobile device 230 performs authentication and sends an API request to retrieve the voicemail message with transcription from voicemail message store 208 via Web Services Gateway 210. After receiving the voicemail message, mobile device 230 displays the voicemail message for user 234.

In some embodiments, the voicemail application server 202 can remove the uploaded message and completed transcription from the transcribe service 226. The voicemail application server 202 deletes both the uploaded audio file and voicemail transcript from the object storage service 224 using an API to protect users' privacy.

Figure 3:
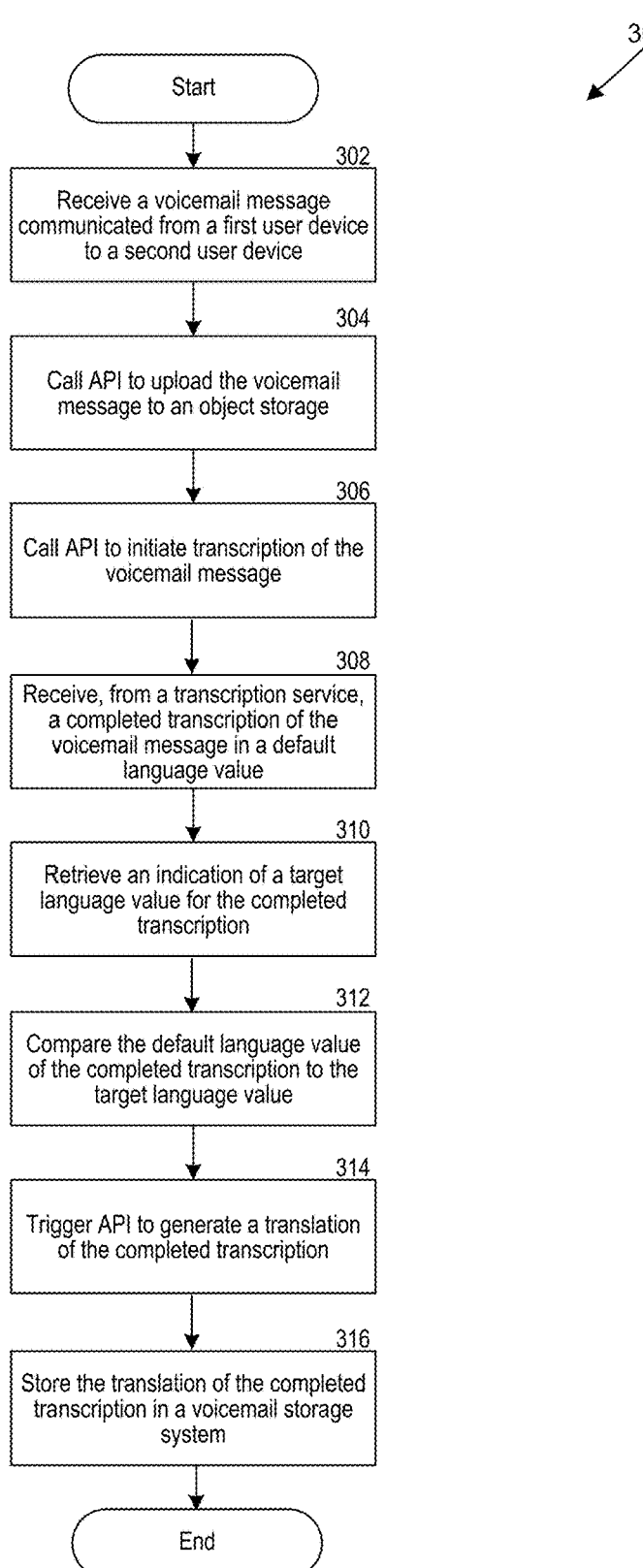
FIG. 3 is a flow diagram that illustrates a method performed by a voicemail translation service of a telecommunications network configured to translate a voicemail message.

FIG. 3 is a flow diagram that illustrates a method 300 performed by a voicemail translation service of a telecommunications network configured to translate a voicemail message. The method 300 can be performed by the system including, for example, a handheld mobile device (e.g., smartphone) and/or a server coupled to the handheld mobile device over a communications network (e.g., a telecommunications network). The handheld mobile device and/or server includes at least one hardware processor and at least one non-transitory memory storing instructions that, when executed by the at least one hardware processor, cause the system to perform the method 300.

At 302, the system can receive a voicemail message communicated from a first user device to a second user device. In one example, the system can receive receiving, via the telecommunications network, a voicemail message communicated from a first user device such as mobile device 204 associated with the first user (e.g., user 232) to a second user device such as mobile device 230 associated with the second user (e.g., user 234). For example, mobile device 204 can initiate a phone call to mobile device 230. The phone call is routed through an IMS network such IMS network 222 associated with the telecommunication network.

At 304, the system can call an API to upload the voicemail message to an object storage service. In one example, the system can call an API to upload the voicemail message to the transcribe service 226. An API is a set of protocols that allow different software applications to communicate with each other. By doing so, APIs facilitate interoperability between different systems. For example, the voicemail application server 202 can record a voicemail message in English, "How are you" from user 232. The voicemail application server 202 can upload the audio file into the object storage service 224 using PutObject REST API. The API can transmit the audio file of the voicemail message to the transcribe service 226 from the object storage service 224. The transcribe service 226 is a cloud-based Automatic Speech Recognition service. The transcribe service 226 can take an audio file and convert it into written text. Using ASR technology, the transcribe service 226 can identify spoken words, accurate punctuations, and other linguistic elements from the voicemail message.

At 306, the system can call an API to initiate transcription of the voicemail message. The system can transmit a command to initiate a transcription of a voicemail message. In one example, the system can transmit a command to initiate a transcription of the voicemail message by the transcribe service 226. For example, after determining there was a successful upload, the voicemail application server 202 can create a transcribe job by calling StartTranscriptionJob REST API. For instance, the API can authenticate the credentials needed to access the transcribe service 226 to start the transcription job.

At 308, the system can receive, from a transcription service, a completed transcription of the voicemail message in a default language value. In one example, the system can receive, from the transcribe service 226, a completed transcription of the voicemail message in a default language value. For example, the default language value refers to the detected language from the audio file. For instance, if the user 232 was speaking in English, then the transcribe service 226 transcribes the voicemail in English. For example, the voicemail application server 202 can retrieve the voicemail transcript from the object storage service 224 using GetObject REST API. This API allows for efficient data retrieval for large files to and from various applications.

At 310, the system can retrieve an indication of a target language value for the completed transcription. In one example, the system can retrieve from the voicemail profile database 206, an indication of a target language value for the completed transcription. The voicemail profile database 206 can store multiple user profiles for subscribers of the voicemail translation service. The target language value corresponds to a user-chosen language value in a user profile of the user 234. For example, the voicemail application server 202 can query voicemail profile database 206 to determine the recipient (e.g., user 234) is a user with voicemail translation service with Spanish as a chosen translation language.

At 312, the system can compare the default language value of the completed transcription to the target language value. In one example, the system can compare the default language value of the completed transcription to the target language value. For example, the voicemail application server 202 can compare the language value of transcript English with user 234 chosen translation language, Spanish.

At 314, the system can trigger another API to generate a translation of the completed transcription. In one example, the system can trigger an API to generate a translation of the completed transcription in accordance with the target language value. For example, the voicemail application server 202 can trigger an API request to process an English transcript to receive a Spanish text in return. The API can transmit the completed transcription to a translate service 228.

At 316, the system can store the translation of the completed transcription in a voicemail storage system. In one example, the system can store the translation of the completed transcription in a voicemail message store 208. The voicemail message store 208 is accessible by the user 234.

The language value of the translation of the completed transcription matches the target language value. For example, the voicemail application server 202 can receive from the translate service 228 the translated voicemail message transcription of "How are you" from user 232 into Spanish as "cómo estás". After that the voicemail application server 202 can store the translated transcription in voicemail message store 208.

Computer System

Figure 4:
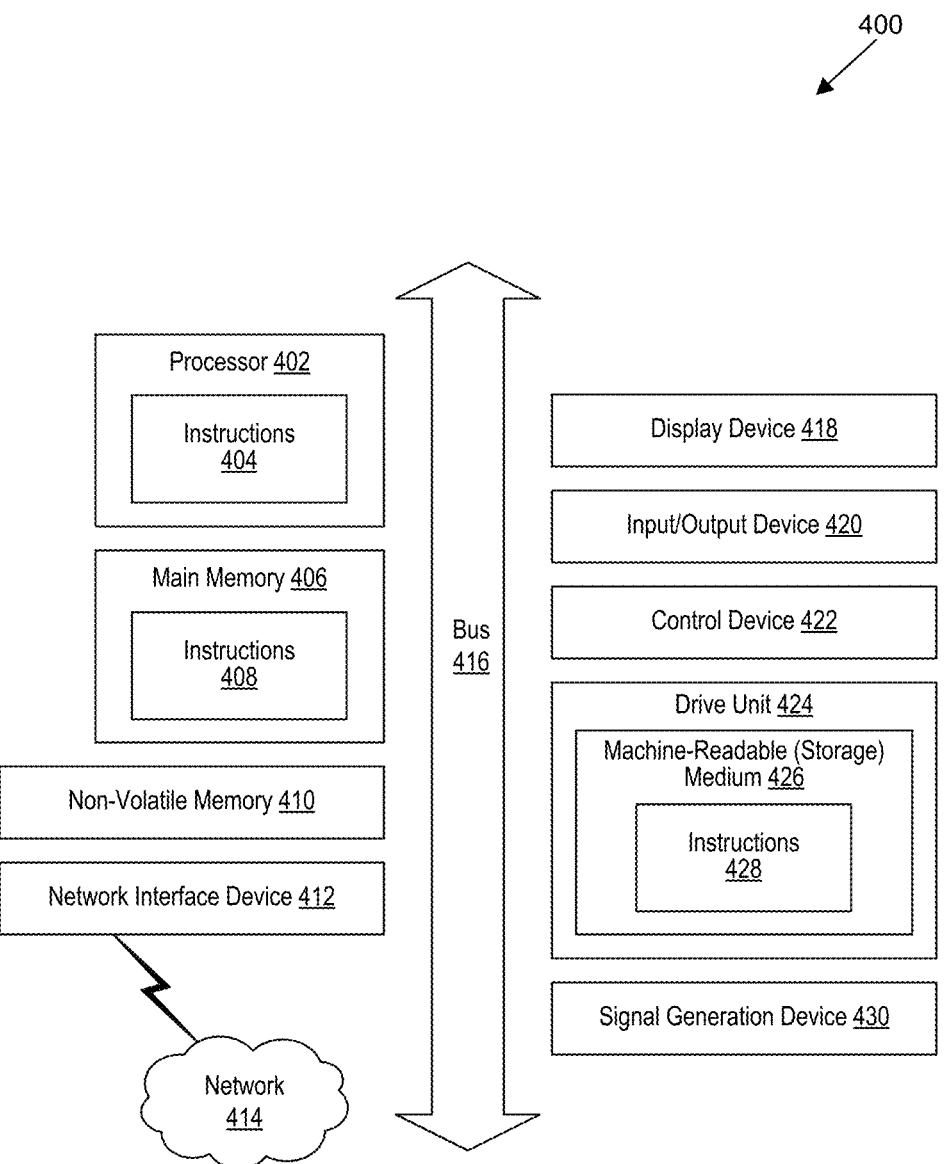
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a video display device 418, an input/output device 420, a control device 422 (e.g., keyboard and pointing device), a drive unit 424 that includes a machine-readable (storage) medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementations, the computer system 400 can be an embedded computer system, a system-on-chip (SOC), a single-board computer system (SBC), or a distributed system such as a mesh of computer systems, or it can include one or more cloud components in one or more networks. Where appropriate, one or more computer systems 400 can perform operations in real time, in near real time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A method performed by a voicemail translation service of a telecommunications network configured to translate a voicemail message, the method comprising:

receiving, via the telecommunications network, a voicemail message communicated from a first user device associated with a first user to a second user device associated with a second user;

calling a first API to upload the voicemail message to a transcription service;

in response to the voicemail message being uploaded to the transcription service, transmitting a command to initiate a transcription of the voicemail message by the transcription service;

receiving, from the transcription service, a completed transcription of the voicemail message in a default language value;

retrieving, from a database, an indication of a target language value for the completed transcription, wherein the database stores a plurality of user profiles for subscribers of the voicemail translation service, and wherein the target language value corresponds to a user-chosen language value in a user profile of the second user;

comparing the default language value of the completed transcription to the target language value;

in response to determining that the default language value of the completed transcription does not match the target language value, triggering a second API to generate a translation of the completed transcription in accordance with the target language value; and storing the translation of the completed transcription in a voicemail storage system accessible by the second user, wherein a language value of the translation of the completed transcription matches the target language value.

2. The method of claim 1 further comprising, prior to transmitting the command to initiate the transcription of the voicemail message by the transcription service:

receiving a confirmation signal from the transcription service via the first API, wherein the confirmation signal indicates a successful receipt and processing of an entirety of the voicemail message.

3. The method of claim 1 further comprising:

invoking a third API to inspect progress of the transcription of the voicemail message by the transcription service;

receiving, via the third API, an indication of an incomplete status for the transcription of the voicemail message by the transcription service; and in response to receiving the indication of the incomplete status, calling the third API to inspect the progress of the transcription of the voicemail message after a time interval and until the transcription of the voicemail message is completed.

4. The method of claim 1 further comprising:

retrieving, from the database, an indication of a user preference, wherein the user preference corresponds to a user-selected delivery method for notifications of translated voicemail messages.

5. The method of claim 4 further comprising:

determining that the user preference includes a short message service (SMS); and transmitting, to the second user device, an SMS message including a notification that the translation of the completed transcription is stored at the voicemail storage system.

6. The method of claim 4 further comprising:

determining that the user preference includes an electronic mailbox; and transmitting a push notification to a secure push proxy server, wherein the secure push proxy server delivers the push notification to the electronic mailbox of the second user, and wherein the push notification indicates that the translation of the completed transcription is stored at the voicemail storage system.

7. The method of claim 4 further comprising:

determining that the user preference includes electronic mail; and transmitting a notification about the translation of the completed transcription is stored at the voicemail storage system to a message transfer agent, wherein the message transfer agent delivers the notification to the second user device via a message delivery agent.

8. The method of claim 1 further comprising:

generating a notification indicating that the translation of the completed transcription is stored at the voicemail storage system; and communicating, via the telecommunications network, the notification to the second user device.

9. The method of claim 1 further comprising:

removing the uploaded message and completed transcription from the transcription service.

10. A system comprising:

at least one hardware processor; and at least one non-transitory memory storing instructions, which, when executed by the at least one hardware processor, cause the system to:

receive, via a telecommunications network, a voicemail message for a user of a user device;

cause a transcription service to transcribe the voicemail message in a default language value;

retrieve an indication of a target language value for the user of the user device;

in response to determining that the default language value of the transcription does not match the target language value, trigger an application programming interface (API) configured to generate a translation of the transcription in accordance with a target language value;

invoke an additional API to inspect progress of the transcription of the voicemail message by the transcription service;

receive, via the additional API, an indication of an incomplete transcription of the voicemail message by the transcription service;

in response to receiving the indication of the incomplete transcription, call the additional API to inspect the progress of the transcription of the voicemail message after a time interval and until the transcription of the voicemail message is completed; and store the translation of the transcription in a voicemail storage system accessible by the user, wherein a language value of the translation of the transcription matches the target language value.

11. The system of claim 10, further caused to:

retrieve, from a database of user profiles, an indication of a user preference, wherein the user preference corresponds to a user selected delivery method for notifications of translated voicemail messages.

12. The system of claim 11, further caused to:

determine that the user preference includes a short message service (SMS); and transmit, to the user device, an SMS message including a notification about the translation of the transcription being stored at the voicemail storage system.

13. The system of claim 11, further caused to:

determine that the user preference includes an electronic mailbox; and transmit a push notification to a secure push proxy server, wherein the secure push proxy server delivers the push notification to the electronic mailbox of the user, and wherein the push notification indicates that the translation of the transcription is stored at the voicemail storage system.

14. The system of claim 11, further caused to:

determine that the user preference includes electronic mail; and transmit a notification indicating that the translation of the transcription is stored at the voicemail storage system to a message transfer agent.

15. The system of claim 10, further caused to:

generate a notification indicating that the translation of the transcription is stored at the voicemail storage system; and communicate, via the telecommunications network, the notification to the user device.

16. A non-transitory, computer-readable storage medium comprising instructions recorded thereon, wherein the instructions, when executed by at least one data processor of a system, cause the system to:

receive an indication of a voicemail message for a user of a user device;

cause a transcription service to transcribe the voicemail message in a default language;

retrieve an indication of a target language for the user;

compare the default language of the transcription to the target language;

determining that the default language does not match the target language;

call an application programming interface (API) configured to generate a translation of the transcription in accordance with the target language;

invoke an additional API to inspect progress of the transcription of the voicemail message by the transcription service;

receive, via the additional API, an indication of an incomplete status for the transcription of the voicemail message by the transcription service;

in response to receiving the indication of the incomplete status, call the additional API to provide feedback regarding the progress of the transcription of the voicemail message; and store the translation of the transcription in a voicemail storage system accessible by the user.

17. The non-transitory, computer-readable storage medium of claim 16, further causing the system to:

retrieve, a user profile of the user, an indication of a user preference, wherein the user preference indicates to a user-selected notification method for translated voicemail messages.

18. The non-transitory, computer-readable storage medium of claim 16, further causes the system to:

communicate, to the user device, a notification indicating that the translation of the transcription is stored at the voicemail storage system.

\* \* \* \* \*